United States Patent [19]

Fan

[11] Patent Number: 5,470,286
[45] Date of Patent: Nov. 28, 1995

[54] REACTION CARRIER ASSEMBLY HAVING ZERO RELATIVE PIN DEFLECTION

[75] Inventor: Changming Fan, Ann Arbor, Mich.

[73] Assignee: General Motors Corporation, Detroit, Mich.

[21] Appl. No.: 282,999

[22] Filed: Jul. 29, 1994

[51] Int. Cl.⁶ .................................................... F16H 1/28
[52] U.S. Cl. ............................................................ 475/331
[58] Field of Search ...................................... 475/331, 346

[56] References Cited

U.S. PATENT DOCUMENTS 5,292,292  3/1994  Heinrich et al. .......................... 475/331

*Primary Examiner*—Dirk Wright
*Attorney, Agent, or Firm*—Donald F. Scherer

[57] ABSTRACT

A reaction carrier assembly that provides zero relative planetary gear support-pin deflection in order to prolong the useful life of the planetary gear set within which the reaction carrier assembly is incorporated. The improved carrier assembly includes a spider and a base portion, such that when a torsional load is applied to the assembly, at least those parts from which the planet gear support pin is supported will deflect equally, thereby effecting zero relative pin deflection. The base portion has an annular flange with a plurality of circumferentially spaced teeth extending radially outwardly selectively to receive the reactive force. The flange also has annularly spaced first ears that extend radially inwardly and are provided with a receiving bore. The first ears alternate with leg-engaging faces that are disposed radially outwardly with respect to the first ears. The spider portion has a deck with a plurality of peripherally spaced legs that extend substantially parallel to the central axis to be connected to the leg-engaging faces. A plurality of peripherally spaced second ears extend radially outwardly of the deck in alternating relation with the legs. Each second ear is provided with a receiving bore that is disposed in register with a receiving bore in the first ears to receive a planet gear support pin therein. A transitional offset extends between each first and second ear and the member from which the ears are supported. Fillets or recesses are provided between each ear and the successively adjacent structure.

12 Claims, 3 Drawing Sheets

REACTION CARRIER ASSEMBLY HAVING ZERO RELATIVE PIN DEFLECTION

TECHNICAL FIELD

The present invention relates generally to vehicular transmission systems. More particularly, the present invention relates to a reaction carrier for use with vehicular planetary gear systems. Specifically, the present invention relates to a novel reaction carrier that assures substantially zero inclination of the pinion support pins, even when the carrier is subjected to opposed torsional forces.

BACKGROUND OF THE INVENTION

The use of planetary gear systems in vehicular transmissions is well known in the vehicular art. In order to achieve a desired output speed from a vehicular transmission, the transmission will receive input from an engine and convert the imparted input energy to an output torque. Such a system will typically employ one or more planetary gear sets that may be connected between a torque converter and the output shaft of the transmission. Each planetary gear set includes a sun gear, a ring gear and a plurality of planet (or pinion) gears supported on a carrier operatively to connect the sun and ring gears. Various torque transfer devices in the nature of clutches and brakes are utilized in combination with the planetary gear sets to control the relative rotation of one or more components thereof and thereby produce the desired drive ratios.

In order to effect an operative connection between a torque transfer device in the nature of a brake or clutch with the planet gears, a reaction carrier may be employed. A typical reaction carrier is made up of a spider portion that is secured to a generally annular base portion. The base portion presents a plurality of circumferentially spaced, radially extending teeth to interact with a torque transfer device. A plurality of circumferentially spaced welding slots alternate with a plurality of planet or pinion support pin receiving bores. The spider portion comprises an annular deck with a plurality of circumferentially spaced legs extending substantially perpendicularly from the deck to be secured within the welding slots in the base portion. A plurality of circumferentially spaced planet or pinion support pin receiving bores alternate with the legs, and the pin receiving bores of the spider portion are disposed in register with an opposed support pin receiving bore in the base portion. A planet or pinion support pin, with a pinion gear rotatably mounted thereon, may be fitted into the opposed support pin receiving bores in the respective base and spider portions.

A reaction carrier having the foregoing construction provides a base portion that is normally stiffer than the top section. In other words, the pin receiving bores in the spider portion will be tangentially displaced to a greater degree than the pin receiving bores in the base portion when opposed forces or torques are applied to the reaction carrier—i.e.: when the forces applied to planet gears are opposed by the forces applied to the teeth on the base portion.

Thus, when an external torque or force is applied to the planetary gear set, the reaction carrier will multiply and transfer the torque to the sun gear, the ring gear and the pinion gears. Furthermore, the deflection of the reaction carrier caused by the torque, deforms the entire planetary gear system. Such deformation effects an inclination of the support pins on which the carrier gears are supported. Typically, this pin inclination, which results by relative tangential deflection of the opposed pin receiving bores, will cause one end of the support pins to deflect farther than the other end. Hence, one is faced with relative deflection or inclination of the support pins.

This unequal deflection by the two ends of the pinion supporting pins is the result of the fact that current reaction carrier designs are such that the interconnecting spider and base portions will have varying degrees of rigidity. Hence, a greater pin deflection occurs at the carrier portion that has less rigidity, which results in a non-zero, relative pin deflection—i.e.: pin inclination. Structural analysis shows that this undesirable pinion pin slope, during application of torque to the reaction carrier, is directly related to the local stiffness of the top and bottom sections of the reaction carrier assembly.

Even when one attempts to maximize the rigidity of the reaction carrier within reasonable size constraints, the aforementioned structural analysis further reveals that the pin slope is nevertheless greater than on the order of two tenths of a percent (0.2%). This two tenths of a percent deflection is enough to cause gear tooth misalignment between the pinion gears, the sun gear and the ring gear. As a result, undesirable gear tooth edge contact is made, which hastens the premature failure of gear teeth. Furthermore, gear tooth misalignment causes failure of the ring gear due to unexpected hoop stress. A further shortcoming of the present reaction carrier design is that the gear tooth misalignment will create vibration within the gear system resulting in added gear noise or grinding.

While attempts have heretofore been made to provide a reaction carrier assembly with structural properties that greatly reduce the relative deflection rate of the pinion support pin and the resulting gear tooth misalignment, there is a limit to which the structural strength of the reaction carrier components can be increased within acceptable weight, and size, limitations. As a result, the prior art has not provided a facile means or structural arrangement by which zero relative pin deflection (i.e.: zero pin inclination) can be achieved.

SUMMARY OF THE INVENTION

It is, therefore, a primary object of the present invention to provide reaction carrier assembly that achieves zero relative pin deflection.

It is also an object of the present invention to provide a reaction carrier assembly, as above, wherein the rigidity of the ears in the spider and base portions of the carrier are equalized such that deflection is not precluded, but is rather equalized, so that both ends of the pin will deflect an equal amount to achieve zero relative pin deflection.

It is another object of the present invention to provide a reaction carrier assembly, as above, having zero relative pin deflection so as to prevent gear tooth misalignment between any pinion gear and the associated sun ring gears.

It is yet another object of the present invention to provide a reaction carrier assembly, as above, having zero relative pin deflection so as to prevent gear tooth edge contact, thereby preventing premature failure of the gear teeth.

It is still another object of the present invention to provide a reaction carrier assembly, as above, having zero relative pin deflection so as to prevent gear tooth misalignment which results in hoop stress, thereby preventing premature failure of the ring gear.

It is a further object of the present invention to provide a reaction carrier assembly, as above, having zero relative pin deflection so as to prevent gear tooth misalignment, thereby preventing excess gear noise caused by vibration.

It is an even further object of the present invention to provide a reaction carrier assembly, as above, having zero relative pin deflection and yet allowing the carrier assembly to be lighter in weight.

It is a further object of the present invention to provide a reaction carrier assembly, as above, having zero relative pin deflection and into which different numbers of pinion gears may be incorporated.

These and other objects of the invention, as well as the advantages thereof over existing and prior art forms, which will be apparent in view of the following derailed specification, are accomplished by means hereinafter described and claimed.

In general, the present invention is directed to achieving zero relative deflection for the planetary gear support pins in a reaction carrier of the type utilized in a vehicular planetary gear set. Such a reaction carrier has a base portion and a spider portion. The base portion has a substantially annular flange with a plurality of circumferentially spaced teeth extending radially outwardly to receive a reactive force. The annular flange also presents a plurality of annularly spaced first ears that extend radially inwardly with respect to the annularly spaced leg-engaging faces on the inner periphery of the flange. A receiving bore penetrates the first ears.

The spider portion has a deck with a plurality of peripherally spaced legs that extend substantially parallel to the central axis of the carrier assembly. A plurality of peripherally spaced second ears extend radially outwardly of the deck in alternating relation with the legs. A receiving bore also penetrates the second ears. The receiving bores in the first and second ears are disposed in register with each other to receive a planet gear support pin therein.

The foregoing general configuration contributes to assuring that the support pins have a zero slope deflection, even when the reaction carrier is subjected to opposing torques during operation of the planetary gear set within which the reaction carrier is being utilized.

To acquaint persons skilled in the arts most closely related to the present invention, one preferred embodiment of a reaction carrier having zero relative pin deflection that illustrates a best mode now contemplated for putting the invention into practice is described herein by, and with reference to, the annexed drawings that form a part of the specification. The exemplary reaction carrier assembly is described in detail without attempting to show all of the various forms and modifications in which the invention might be embodied. As such, the embodiment shown and described herein is illustrative, and as will become apparent to those skilled in these arts can be modified in numerous ways within the spirit and scope of the invention; the invention being measured by the appended claims and not by the details of the specification.

DESCRIPTION OF AN EXEMPLARY EMBODIMENT

Figure 1:
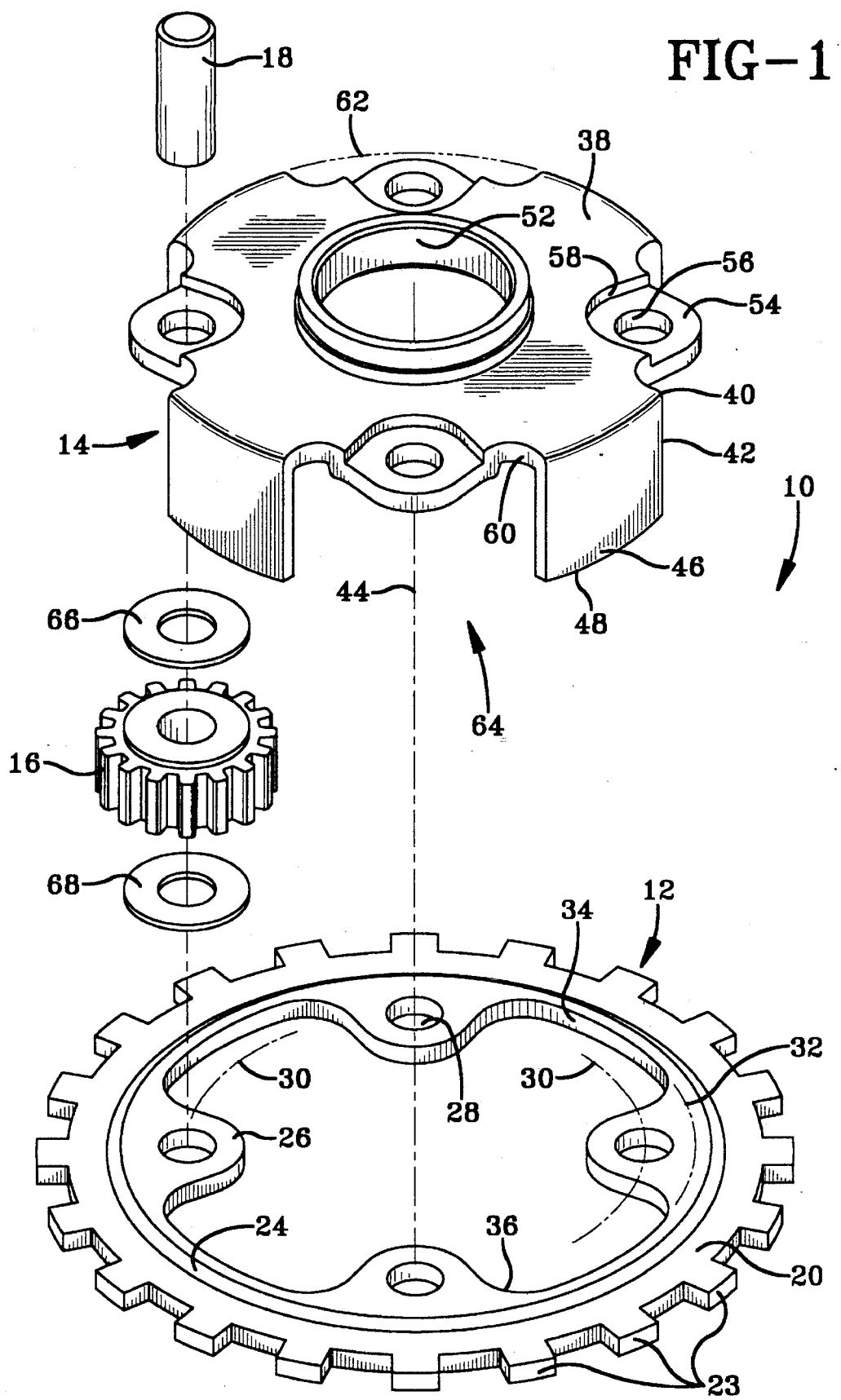
FIG. 1 is an exploded perspective view of a zero relative pin deflection reaction carrier assembly embodying the concepts of the present invention.
Figure 2:
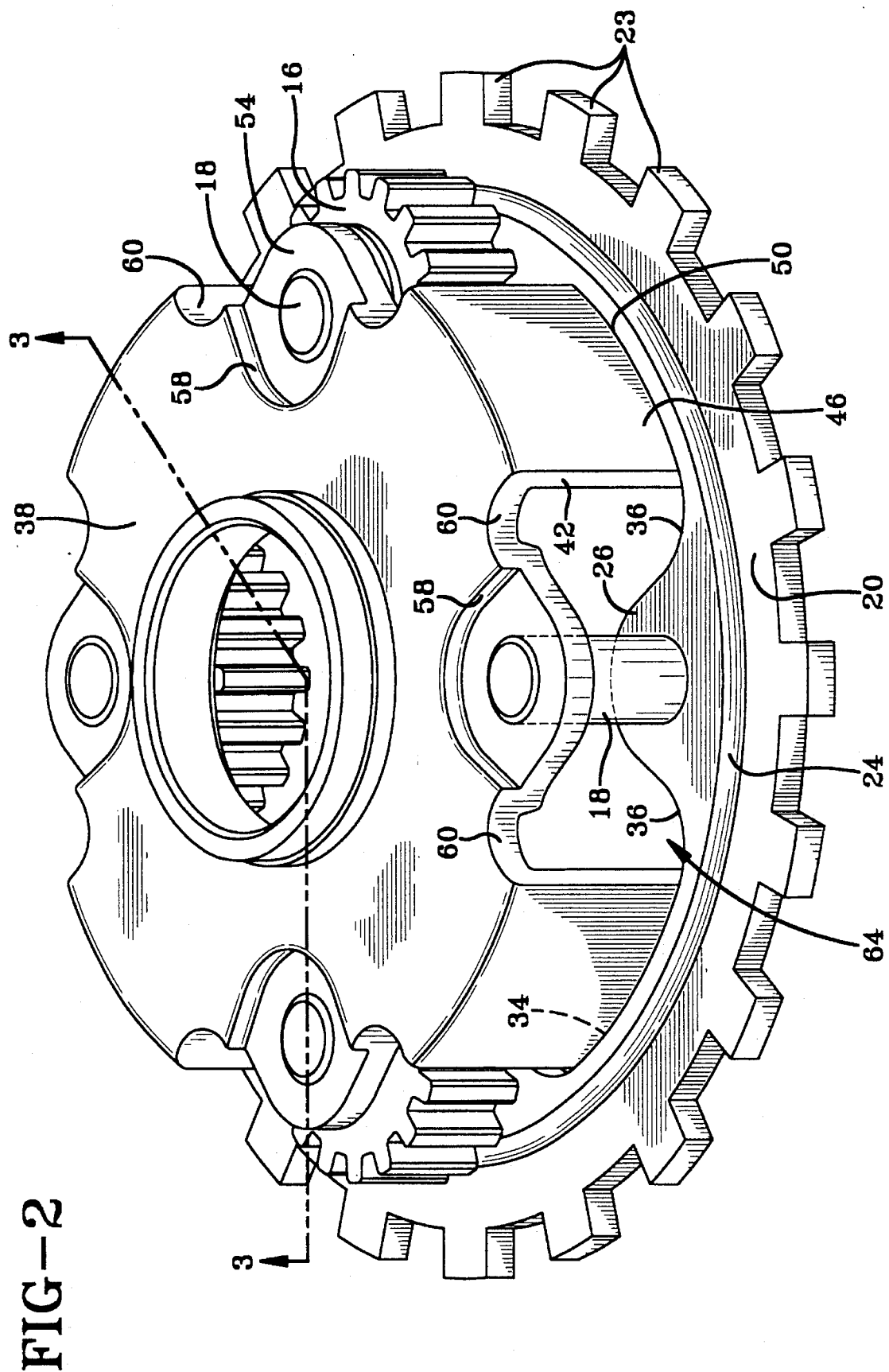
FIG. 2 is a perspective view of the relatively zero pin deflection reaction carrier assembly depicted in FIG. 1 but represented as being assembled; and, FIG. 3 is a cross-sectional view taken substantially along line 3—3 of FIG. 2.

A reaction carrier assembly that has zero relative pin deflection, and which embodies the concepts of the present invention, is designated generally by the numeral 10 on the accompanying drawings. Broadly, it can be seen in FIG. 1 that the reaction carrier assembly 10 is made up of a base portion 12 to which a spider portion 14 may be secured, and with a plurality of planet or pinion gears 16 mounted on individual support pins 18 that are, in turn, mounted between the base and spider portions 12 and 14, respectively.

In further detail, the base portion 12 has a generally annular flange 20 from which a plurality of teeth 22 extend radially outwardly in circumferentially spaced relation. Those skilled in the art will appreciate that the teeth 22 function to interact with an appropriate torque transfer device selectively to restrain the reaction carrier assembly 10 within a drum or other similar device contained in a vehicular transmission system. Neither the torque transfer device nor the drum are depicted, but it will be readily understood that the interaction of the teeth 22 with the torque transfer device provides a relative torque that opposes the torque inherent when the planetary gears supported by the reaction carrier assembly 10 are subjected to a load.

Figure 3:
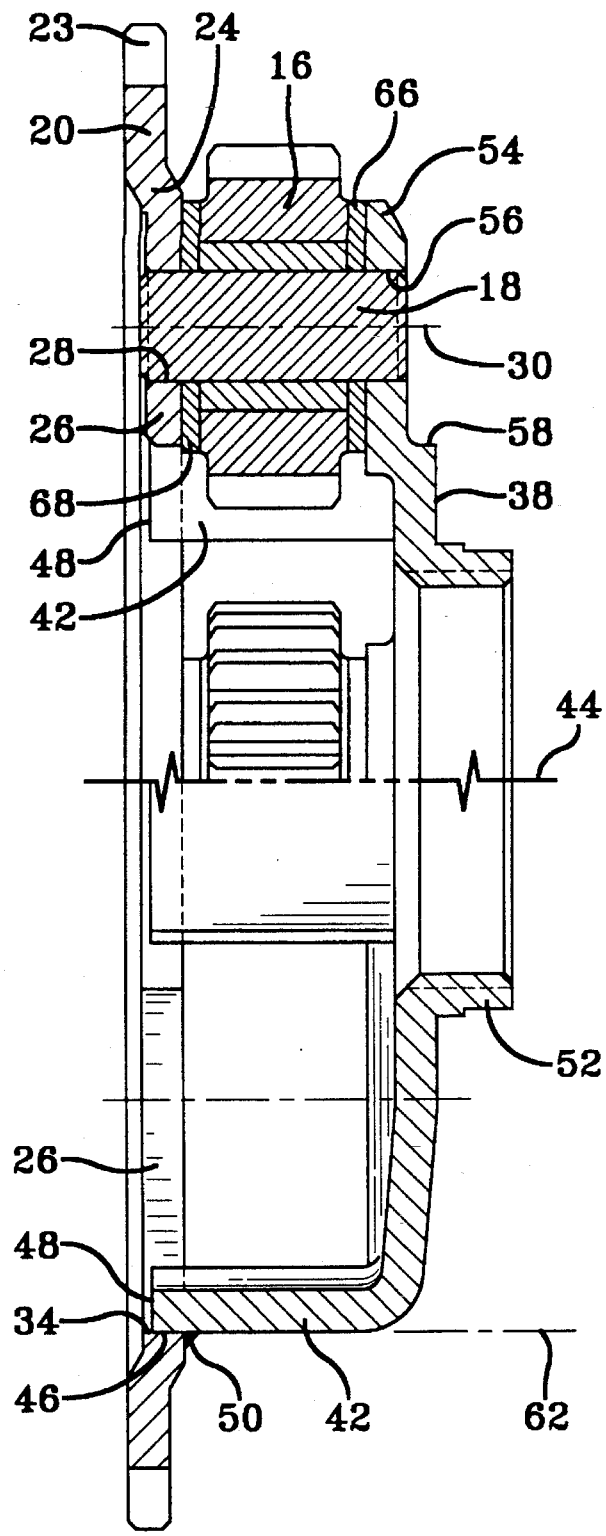

As best seen in FIG. 3, the inner periphery of the annular flange 20 on the base portion 12 joins an inclined, transitional offset 24. A plurality of circumferentially spaced first ears 26, each with a corresponding support pin receiving bore 28, extend radially inwardly from the transitional offset 24. The transitional offset 24 accomplishes three objectives—viz.: (1) the transitional offset enhances the bending strength of the flange transversely of its planar configuration; (2) the transitional offset tends to preclude interference between the pinion gears 16 and the base portion 12; and (3) the transitional offset tends to accommodate the desired tangential deflection of the first ears 26. The ears alternate with arcuate leg-engaging faces 34. The leg-engaging faces 34 are located radially outwardly of the bolt circle 30 along which the pin receiving bores 28 penetrate the first ears 26. In a typical installation, wherein the annular flange 20 is approximately 4.5 mm thick, the diameter of the reference circle 32 along which the arcuate leg-engaging faces 34 are disposed might be on the order of about 110.0 mm, and the bolt circle 30 might be on the order of about 91.75 mm.

A fillet 36 extends between each first ear 26 and the adjacent leg-engaging face 34. To continue with the typical dimensions disclosed in the previous paragraph, the fillet 36 would have a radius on the order of approximately 5.5 mm, and the fillet 36 would be tangential to both the first ear 26 and the contiguously successive leg-engaging faces 34. The diametral span between the opposed first ears 26 will be sufficient to permit a sun gear, or the sun gear supporting shaft, to extend through the base portion 12 without interference.

The spider portion 14 has a generally annular deck 38 from the outer periphery 40 of which a plurality of circumferentially spaced legs 42 extend in substantially parallel disposition with respect to the center axis 44 of the carrier assembly 10. The radially outer surface 46 of the legs 42—at least in proximity to the outboard end 48 thereof—are disposed to lie on contiguous juxtaposition with the leg-engaging faces 34 on the base portion 12. Each leg 42 may be fixedly secured to a corresponding leg-engaging face 34 by a weld 50.

A collar 52 disposed concentrically about the central axis 44 extends through the medial portion of the deck 38 to receive a sun gear shaft, not shown. Interposed between the successive legs 42, and extending radially outwardly from the deck 38, are a plurality of second ears 54 which correspond in number to the first ears 26. Each second ear 54 is also penetrated by a pin receiving bore 56 that is disposed in register with the pin receiving bore 28 in the aligned first ear 26. The second ears 54 are each integrally connected to the deck 38 by a curvilinearly disposed, transitional offset 58. A concavely arcuate recess 60 extends from the juncture of each second ear 54 to the juncture of the most closely adjacent leg 42 with the deck 38. The arcuate recess 60 is centered along the imaginary reference circumference 62 within which the radially outer surface 46 of the legs 42 is disposed, with the arcuate recess 60 having a minimum radius of approximately 5.5 mm.

With reference to the spider portion 14, the transitional offset 58 enhances the bending strength of the deck 38 and also precludes interference between the pinion gears 16 and the spider portion 14 of the carrier assembly 10. Moreover, the combination of the transitional offsets 58 and the arcuate recess 60 tends to accommodate the desired tangential deflection of the second ears 54.

When the spider and base portions 12 and 14, respectively, are joined together, a plurality of gear access openings 64 are presented, one such opening 64 being located between each successive pair of legs 42. The support pins 18 define the center of each opening, and one planet gear 16 is rotatably mounted on each support pin 18. It should be appreciated that each pin 18 will be either press-fit, staked or otherwise secured to the base and spider portions of the carrier assembly 10. Rotation of the planet gear 16 received on each support pin 18 may be enhanced by interposing a first flat bushing 66 between the planet gear 16 on the first ear 26 and interposing a similar, second flat bushing 68 between each planet gear 16 and the second ear 54.

As can be perceived from the aforementioned description and referenced drawings, there are several structural features of the present invention that distinguishes it from the prior art. These features are incorporated so that each pinion support pin 18 will be deflected the same amount at each of its ends under loading of the pinion gear 16. That is, the pin 18 may be tangentially translated, and as such, a non-zero slope or deflection of the pinion support pin 18 results when the two ears holding the pin 18 are deflected through equal distances when opposing torque forces are applied to the reaction carrier assembly 10. As discussed previously, the zero relative pin deflection will preclude gear tooth misalignment within the planetary gear system, will preclude structural failure of the gear teeth, and will preclude failure of the ring gear due to hoop stress. These results are accomplished because the present invention provides a structural arrangement whereby each first and second ear is designed to deflect to the same degree. This is accomplished by several of the structural features heretofore described. That is, the respective offsets 24 and 58; the arcuate recesses 60 and the fillets 36 in combination with the location of the arcuate leg-engaging faces 34; and, by locating the legs 42 radially outwardly from their heretofore prior location relative to the supporting pin receiving bores 56, thus making the arcuate recesses 60 between the second ears 54 and the legs 42 more pronounced than in prior reaction carriers.

It should also be appreciated that the flange portion of prior art reaction carriers is of annular construction such that a greater amount of steel—which is located between each successive support pin receiving bore 26. By removing unnecessary steel between the first ears 26 and by locating the legs 42 radially outwardly, the stiffness of the two pans are effectively equalized. This is supported by a structural analysis and testing which shows that when the reaction carrier assembly 10 of a planetary gear system is subjected to a load, or has a torque applied thereto, at least the ears 26 on the base portion 12 and the ears 54 on the spider portion 14, when embodying the concepts of the present invention, will be deflected equally. As a result, the support pin 18, which is held at each end by the axially spaced first and second ears 26 and 54, respectively, will be deflected equally at each end. Thus, the present invention will produce zero pin slope, thereby increasing the life of the planetary gear system.

Furthermore, although four pinion gears 16 are retained within the reaction carrier assembly 10 in the preferred embodiment, it is possible that any other desired number of pinion gears—typically three—could be received within a carrier of similar construction. As a result, the interconnecting components of the carrier would be sized accordingly while still maintaining the equalized stiffness between the base portion 12 and the spider portion 14 to preserve the zero relative pin deflection when the carrier is subjected to a load.

While only one preferred overall embodiment of the present invention is disclosed, it is to be clearly understood that the same is susceptible to numerous changes apparent to one skilled in the art. Therefore, the scope of the present invention is not to be limited to the details shown and described but is intended to include all changes and modifications which come within the scope of the appended claims.

As should now be apparent, the present invention not only teaches that a reaction carrier embodying the concepts of the present invention is capable of providing zero pin slope deflection, thus preventing damage to the planetary gear system, but also that the other objects of the invention can likewise be accomplished.

The embodiments of the invention in which an exclusive property or privilege is claimed are defined as follows:

1. A reaction carrier assembly for a planetary gear set having a central axis, said carrier assembly providing zero relative pin deflection for the planet gear support pins and comprising:

a base portion and a spider portion;

said base portion having a substantially annular flange with a plurality of circumferentially spaced teeth extending radially outwardly selectively to receive the reactive force;

said substantially annular flange also having first ears extending radially inwardly;

said first ears provided with a receiving bore;

said spider portion having a deck with a plurality of circumferentially spaced legs extending substantially parallel to said central axis;

a plurality of peripherally spaced second ears extending radially outwardly of said deck in alternating relation with said legs;

said second ears provided with a receiving bore;

said receiving bores in said first and second ears disposed in register with each other to receive a planet gear support pin therein.

2. A reaction carrier assembly, as set forth in claim 1, further comprising:

a plurality of annularly extending, and annularly spaced leg-engaging faces on said flange;

said leg-engaging faces substantially defining the inner perimeter of said annular flange;

said first ears being alternatingly disposed with respect to said leg-engaging faces;

said leg-engaging faces located radially outwardly of each said receiving bore in said first ears.

3. A reaction carrier assembly, as set forth in claim 2, further comprising:

a fillet disposed between each said first ear and said successively adjacent leg-engaging faces.

4. A reaction carrier assembly, as set forth in claim 2, further comprising:

a transitional offset extending between said annular flange and said first ears on said base.

5. A reaction carrier assembly, as set forth in claim 4, further comprising:

a fillet disposed between each said first ear and said circumferentially adjacent leg-engaging faces.

6. A reaction carrier assembly, as set forth in claim 5, further comprising:

an arcuate recess disposed between each said second ear and said successively adjacent legs.

7. A reaction carrier assembly, as set forth in claim 1, further comprising:

a transitional offset extending between said deck and said second ears on said spider.

8. A reaction carrier assembly, as set forth in claim 7, further comprising:

an arcuate recess disposed between each said second ear and said successively adjacent legs.

9. A reaction carrier assembly, as set forth in claim 8, further comprising:

a plurality of annularly extending, and annularly spaced leg-engaging faces on said flange;

said leg-engaging faces substantially defining the inner perimeter of said annular flange;

said first ears being alternatingly disposed with respect to said leg-engaging faces;

said leg-engaging faces located radially outwardly of each said receiving bore in said first ears.

10. A reaction carrier assembly, as set forth in claim 9, further comprising:

a fillet disposed between each said first ear and said successively adjacent leg-engaging faces.

11. A reaction carrier assembly, as set forth in claim 10, further comprising:

a transitional offset extending between said annular flange and said first ears on said base.

12. A reaction carrier assembly, as set forth in claim 1, wherein:

the stiffness of said flange and spider portions are equalized to provide zero relative pin deflection when said reaction carrier assembly is subjected to a opposing torque loads.

* * * * *